(12) United States Patent
Sim

(10) Patent No.: US 8,275,543 B2
(45) Date of Patent: Sep. 25, 2012

(54) PATH GUIDANCE APPARATUS AND METHOD OF INPUTTING EXECUTION COMMAND THEREOF

(75) Inventor: Jung-Sub Sim, Seoul-si (KR)

(73) Assignee: LG Electronics Inc., Seoul (KR)

( * ) Notice: Subject to any disclaimer, the term of this patent is extended or adjusted under 35 U.S.C. 154(b) by 621 days.

(21) Appl. No.: 12/502,784

(22) Filed: Jul. 14, 2009

(65) Prior Publication Data

US 2010/0017112 A1    Jan. 21, 2010

(30) Foreign Application Priority Data

Jul. 18, 2008   (KR) ................ 10-2008-0070140

(51) Int. Cl.
*G01C 21/00* (2006.01)
(52) U.S. Cl. .............. 701/411; 340/995.19; 345/173
(58) Field of Classification Search ............ 400/527; 701/411, 416, 425, 516; 340/995.19; 345/173
See application file for complete search history.

(56) References Cited

U.S. PATENT DOCUMENTS

| | | | | |
|---|---|---|---|---|
| 5,999,892 A * | 12/1999 | Fan | | 702/158 |
| 8,145,425 B2 * | 3/2012 | Goto et al. | | 701/416 |
| 8,170,791 B1 * | 5/2012 | Bellesfield et al. | | 701/409 |
| 8,175,803 B2 * | 5/2012 | Caraballo | | 701/426 |
| 8,190,361 B2 * | 5/2012 | Lee et al. | | 701/414 |
| 8,204,684 B2 * | 6/2012 | Forstall et al. | | 701/433 |
| 8,209,075 B2 * | 6/2012 | Senneff et al. | | 701/23 |
| 8,209,123 B2 * | 6/2012 | Miyazaki | | 701/532 |
| 2006/0026521 A1 * | 2/2006 | Hotelling et al. | | 715/702 |
| 2007/0067104 A1 * | 3/2007 | Mays | | 701/211 |
| 2007/0260395 A1 * | 11/2007 | Matsuoka et al. | | 701/209 |
| 2008/0180406 A1 * | 7/2008 | Han et al. | | 345/173 |
| 2008/0201074 A1 * | 8/2008 | Bleckman et al. | | 701/211 |
| 2009/0157289 A1 * | 6/2009 | Graessley | | 701/123 |

\* cited by examiner

*Primary Examiner* — Tuan C. To
(74) *Attorney, Agent, or Firm* — Birch, Stewart, Kolasch & Birch, LLP

(57) ABSTRACT

A method of controlling a navigation apparatus, and which includes displaying map information on a touch screen display unit of the navigation apparatus, receiving at least a first touch input signal corresponding to a touching of a first position on the display unit and a second touch input signal corresponding to a touching of a second position on the display unit while the first position is continuously touched, calculating, via a controller, a traveling route including the touched first and second positions, and displaying the calculated traveling route on the displayed map information to inform a driver of a vehicle including the navigation apparatus about the calculated traveling route including the first and second positions.

18 Claims, 7 Drawing Sheets

PATH GUIDANCE APPARATUS AND METHOD OF INPUTTING EXECUTION COMMAND THEREOF

CROSS REFERENCE TO A RELATED APPLICATION

The present application is related to and claims priority to Korean patent application 10-2008-0140, filed in Korea on Jul. 18, 2008, the entire contents of which are hereby incorporated by reference.

BACKGROUND OF THE INVENTION

1. Field of the Invention

The present invention relates to a path guidance apparatus and corresponding method for providing a user with navigation information.

2. Description of the Related Art

Navigation apparatuses allow a user to set a moving path and inform him or her of their current path. Navigation apparatus also generally include a touch screen that the user can touch to input or select commands. However, the touch screen is limited in nature because the user can only enter one command at a time in a sequential manner. This is often tedious and inconvenient to the user.

SUMMARY OF THE INVENTION

Accordingly, one object of the present invention is to address the above-noted and other problems with the related art.

Another object of the present invention is to provide a path guidance apparatus (hereinafter referred to as a navigation apparatus) and corresponding method that allows a user to perform a multiple touch input operation on the apparatus so as to calculate a path between the touched points.

Yet another object of the present invention is to provide a navigation apparatus and corresponding method for allowing a user to magnify information displayed on the navigation apparatus using a multiple touch input operation.

To achieve these and other advantages and in accordance with the purpose of the present invention, as embodied and broadly described herein, the present invention provides in one aspect a method of controlling a navigation apparatus, and which includes displaying map information on a touch screen display unit of the navigation apparatus, receiving at least a first touch input signal corresponding to a touching of a first position on the display unit and a second touch input signal corresponding to a touching of a second position on the display unit while the first position is continuously touched, calculating, via a controller, a traveling route including the touched first and second positions, and displaying the calculated traveling route on the displayed map information to inform a driver of a vehicle including the navigation apparatus about the calculated traveling route including the first and second positions.

In another aspect, the present invention provides a navigation apparatus including a display unit including a touch screen and configured to display map information, a receiving unit configured to receive at least a first touch input signal corresponding to a touching of a first position on the display unit and a second touch input signal corresponding to a touching of a second position on the display unit while the first position is continuously touched, and a controller configured to calculate a traveling route including the touched first and second positions, and to control the display unit to display the calculated traveling route on the displayed map information to inform a driver of a vehicle including the navigation apparatus about the calculated traveling route including the first and second positions.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
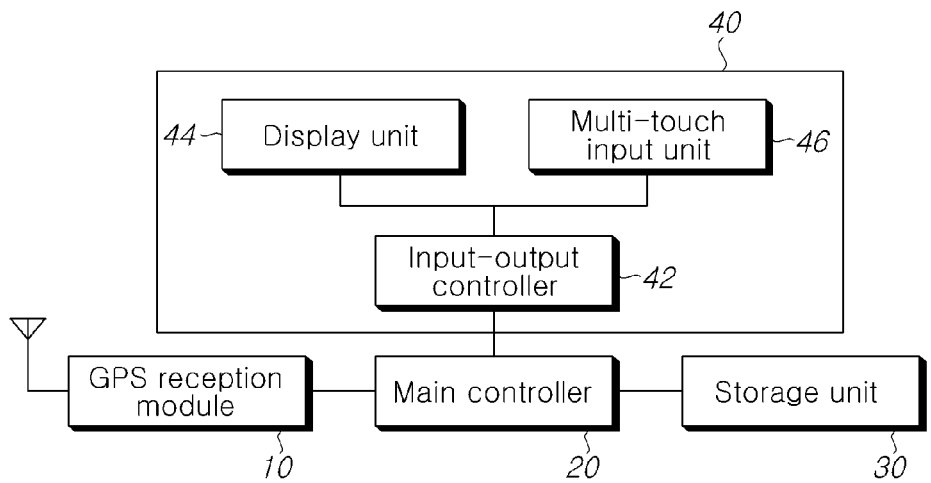
FIG. 1 is a block diagram illustrating a navigation apparatus according to an embodiment of the present invention.

FIG. 1 is a block diagram illustrating a navigation apparatus according to an embodiment of the present invention. As shown, the navigation apparatus includes a GPS reception module 10 for receiving satellite navigation signals and for calculating a current position. Also included is a main controller 20 for receiving the position information calculated from the GPS reception module 10 and for displaying the position information on a display unit 44 together with map information. The map information may be stored in a storage unit 30.

In addition, the main controller 20 receives path setting or path search commands from a user, searches for a path based on the input commands, and displays the searched path on a map to inform the user of the path along which the user should move. The navigation apparatus also includes an input-output unit 40 connected to the main controller 20. As shown, the input-output unit 40 includes the display unit 44 for displaying information, a multi-touch input unit 46 for receiving a command or commands from a user, and an input-output controller 42 for controlling the display unit 44 and the multi-touch input unit 46. The input-output unit 40 can also be configured to receive voice instructions or commands and to output voice information (e.g., driving directions).

In addition, the display unit 44 and the multi-touch input unit 46 may be configured as a touch screen. Thus, the touch screen including a touch panel attached to a display panel can receive a user command through a touch input and also output an output image. Further, the multi-touch input unit 46 refers to a touch input unit capable of distinguishing and recognizing positions of a plurality of touches simultaneously input on the touch panel, and more specifically, allowing the input-output controller 42 to individually recognize a plurality of touch inputs input on the touch panel. That is, the input-output controller 42 is configured to recognize each touch point for a plurality of touch inputs input on the multi-touch input unit 46 and to transfer values of the touch points to the main controller 20. In addition, the following description refers to a multi-touch input in which after a first touch is input on the touch panel, a second touch is input at another point before the first touch is released.

Figure 2:
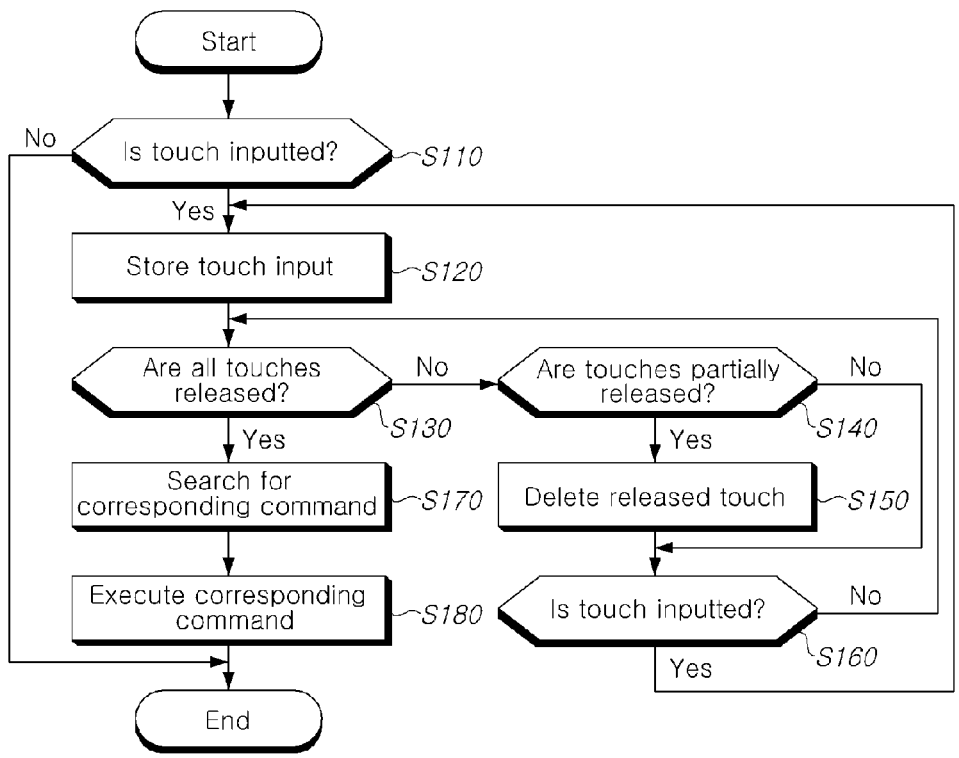
FIG. 2 is a flowchart illustrating a method of inputting an execution command of a navigation apparatus according to an embodiment of the present invention.

Next, FIG. 2 is a flowchart illustrating a method of providing navigation information according to an embodiment of the present invention. FIG. 1 will also be referred to in this description. As shown, the method includes detecting a touch input when the user touches the multi-touch input unit 46 (step S110). When the touch input is generated on the multi-touch input unit 46 (Yes in step S110), the main controller 20 stores the position of the touch input in the storage unit 30 or an additional buffer memory (step S120). The method then determines whether all of the user's touches on the multi-touch input unit 46 are released (step S130).

If all of the touches are not released (No in step S130), the method determines whether some of the user touch inputs are released (step S140). When the touches are partially released (Yes in step S140), the method includes deleting information on the released touches from the storage unit 30. Next, the method includes determining if another touch input has occurred, and when another touch has occurred (Yes in step S160), the method returns to step S120. The touch information on the additional touch input is also stored in the storage unit 30. In addition, the stored information includes an order of touches as well as touch points.

Also, the information deleted in step S150 is to correct a multi-touch input by releasing some erroneously input touches among the multi-touch input when a user erroneously inputs touches while inputting the multi-touch operation. For example, the user may touch a first position and then touch a second position that they did not mean to touch. Thus, in this instance, the user can release the second touched position while maintaining the first touched position and touch a new second position. Also, when the method determines all of the touches are not released (No in S130) and none of the touches are partially released (No in S140), the method determines if another touch has been input (S160). Thus, the user can input three or more touches, in which all touched positions are stored in the storage unit 30 or a buffer memory, for example.

When the method determines all touches (two or more touches) have been released (Yes in step S130), the main controller 20 searches for a command corresponding to the multi-touch operation and executes the command (steps S170 and S180). In addition, the main controller 20 performs the search process based on the stored touch information on the multi-touch. The command may be to determine a particular driving route between the touched points, magnifying a map displayed on the display unit 44 of the navigation apparatus, etc.

Figure 3A:
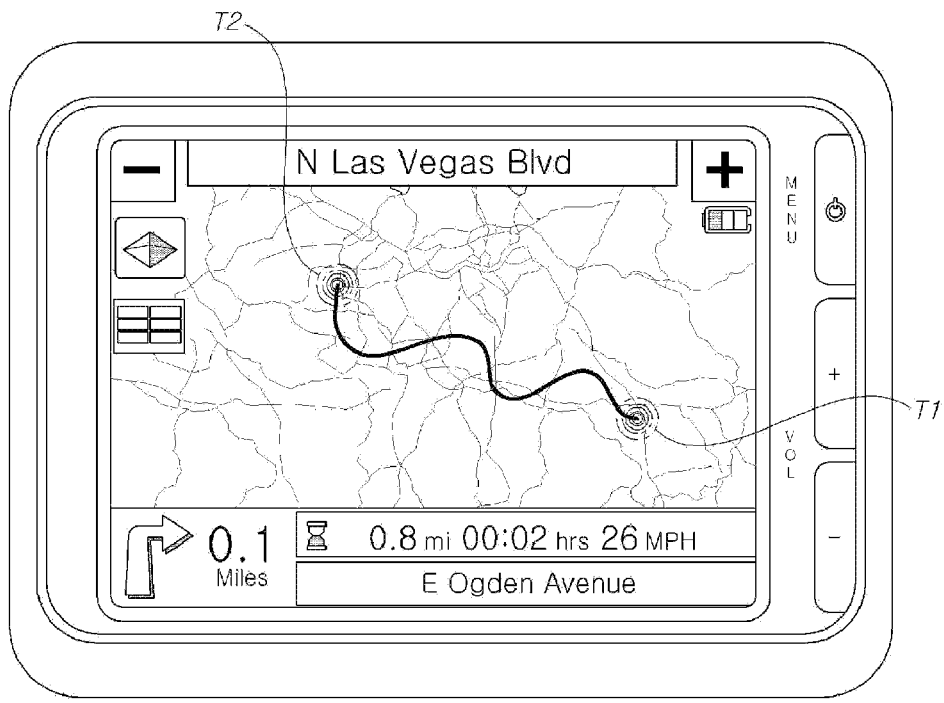
FIGS. 3a-3c are overviews of display screens illustrating setting a path using a multi-touch input operation according to an embodiment of the present invention.
Figure 3B:
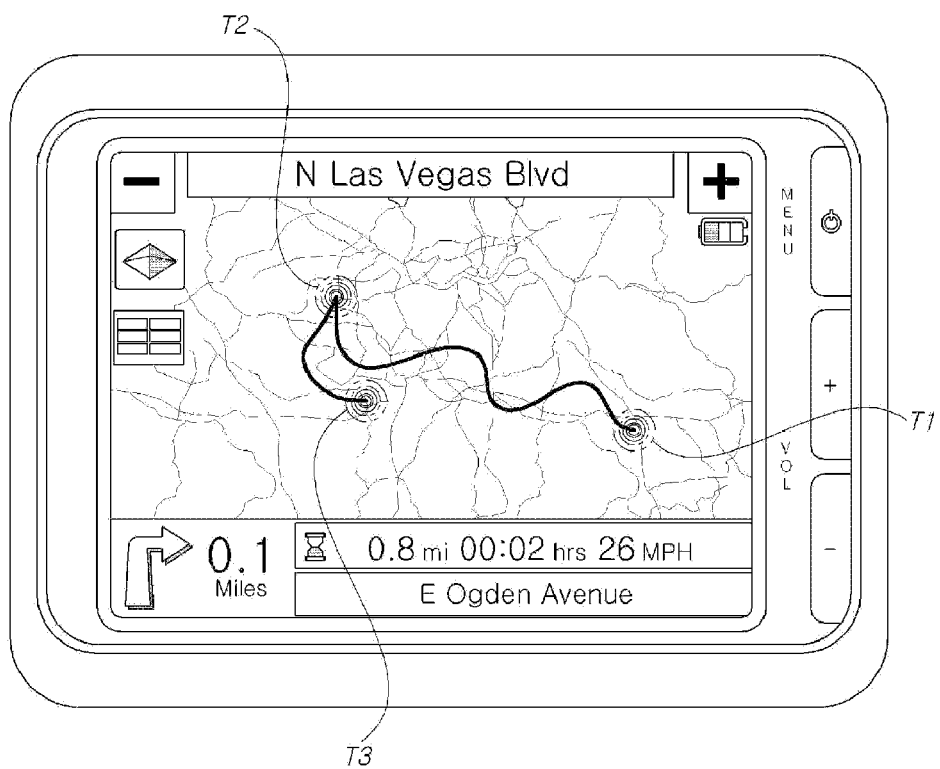
Figure 3C:
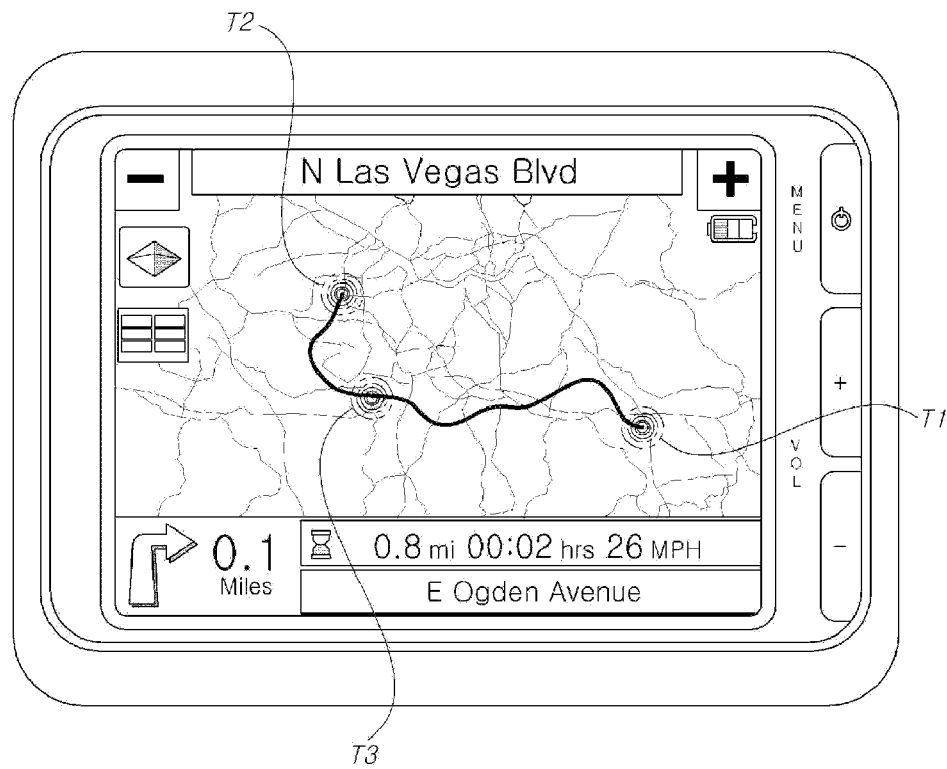

For example, FIGS. 3a to 3c are overviews of display screens illustrating a path being calculated using a multi-touch input operation. FIGS. 1 and 2 will also be referred to throughout the rest of the description of the present invention. In more detail, FIG. 3a illustrates the controller 20 calculating a path between two touch input points when the user inputs a first touch T1 and then a second touch T2 while a map is displayed. That is, the user touches a first position T1 and then touches a second position T2 while maintaining the first touched position T1. The user then releases the first and second touched positions T1 and T2. Thus, with reference to FIG. 2, the method would perform steps S110 (Yes), S120, S130 (No), S140 (No), S160 (Yes), S110 (Yes), S120, S130 (Yes), S170 and S180. Thus, the controller 20 would store information about the two touched points T1 and T2, and display a route on the map to be driven based on the two touched points.

FIG. 3b is similar to FIG. 3a, but includes the user touching three positions T1, T2 and T3 in a sequential order (i.e., T1, T2 and then T3). The user also maintains the previously touched position while touching a next position. In more detail, the user first touches the position T1 and then touches the position T2, while maintaining the touching of the first position T1. Then, the user touches the third position T3 while maintaining the touching of the first and second positions T1 and T2. Thus, with reference to FIG. 2, the steps would be performed in this order: S110 (Yes), S120 (first touched position T1 is stored), S130 (No), S140 (No), S160 (Yes), S110 (Yes), S120 (second touched position T2 is stored), S130 (No), S140 (No), S160 (Yes), S110 (Yes), S120 (third touched position T2 is stored), S130 (Yes), S170 and S180.

Thus, in the example shown in FIG. 3b, the user touches three positions T1, T2 and T3, releases all of the three touched points, and the controller 20 calculates a driving route from the first position T1 to the second position T2, and from the second position T2 to the third position T3 as shown in FIG. 3b. Note that if in FIG. 3b, if the user touched the position T3 before touching the position T2, the displayed traveling route would include a road from the first position T1 to the third position T3 and then to the second position T2. Thus, in the example shown in FIG. 3b, the order of touching affects the calculated traveling path.

This differs from FIG. 3c, which illustrates an example of the controller 20 calculating a path including respective touch points for three or more touch inputs irrespective of the order of touching. That is, as shown in FIG. 3, the user sequentially touches the positions T1, T2 and T3, and the controller 20 calculates a path passing through all of the first, second and third touch points T1, T2, and T3 irrespective of the input order based on a predetermined path calculating condition (i.e., the path is from the position T1 to T3 and then to T2). In this example, the path calculating condition is a path calculating condition set in the navigation apparatus such as the shortest path, a preference of a recommended road, a preference of a highway, and the like. That is, the controller 20 displays a traveling route between the three positions based on a preferred route.

Figure 4A:
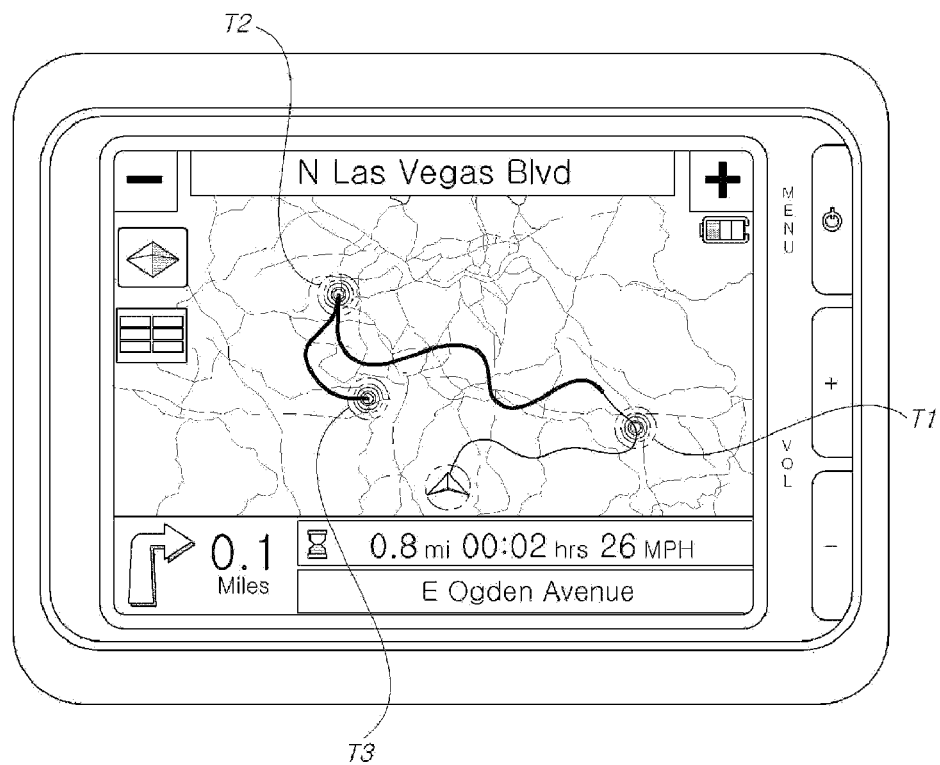
FIGS. 4a and 4b are overviews of display screens illustrating setting a path using a multi-touch input operation according to another embodiment of the present invention.

Next, FIGS. 4 and 5 illustrate a method of calculating and providing a driving route based on multiple touched points and using a current location of the vehicle. In more detail, FIG. 4a is similar to FIG. 3b, but includes providing a traveling route from the current position of the vehicle to the first touched position T1. Thus, in this example, the controller 20 provides a driving route from the current position of the vehicle, to the first touched position T1, to the second touched position T2 and to the third touched position T3 in sequential order.

Figure 4B:
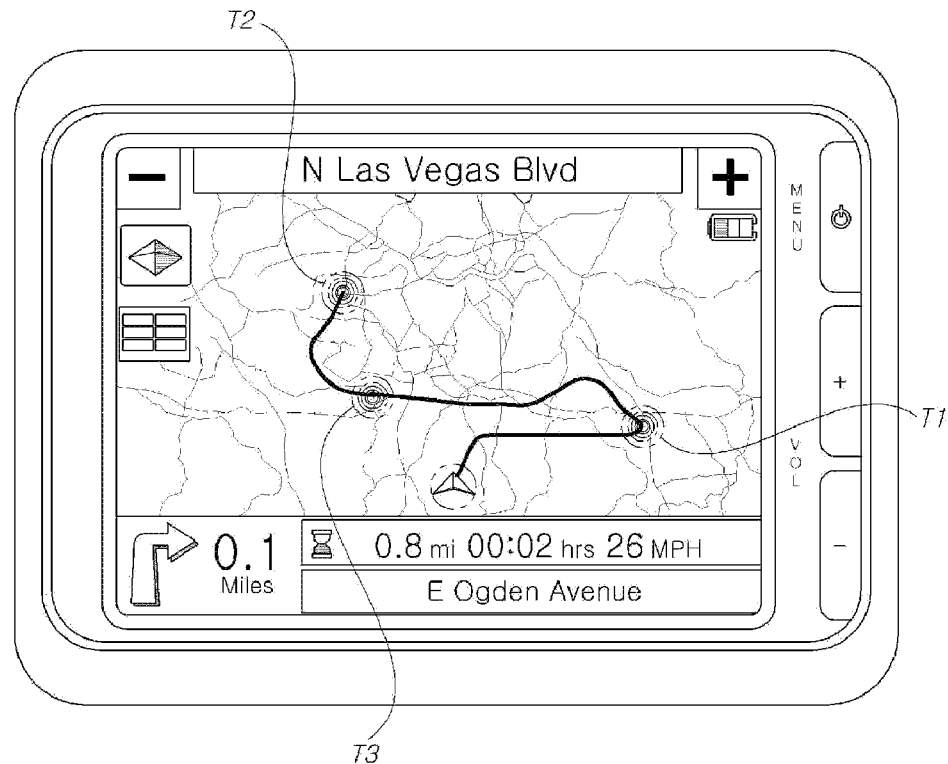

FIG. 4b is similar to FIG. 3c, but includes providing a traveling route from the current position of the vehicle. That is, FIG. 4c illustrates the controller 20 calculating a traveling route without consideration of the order of the touched points and includes a traveling route from the current position of the vehicle. The displayed traveling path can be a preferred traveling path based on preset user preferences, a shortest traveling path in miles, a shortest traveling path in minutes, a traveling path along mostly major highways, a scenic traveling path, etc. The user can also set his or her desired preferences for providing the traveling route using the appropriate menu options provided with the navigation apparatus of the present embodiment. The preferred traveling preferences can also be preset by a manufacturer of the apparatus, and then later be changed by the user.

Figure 5A:
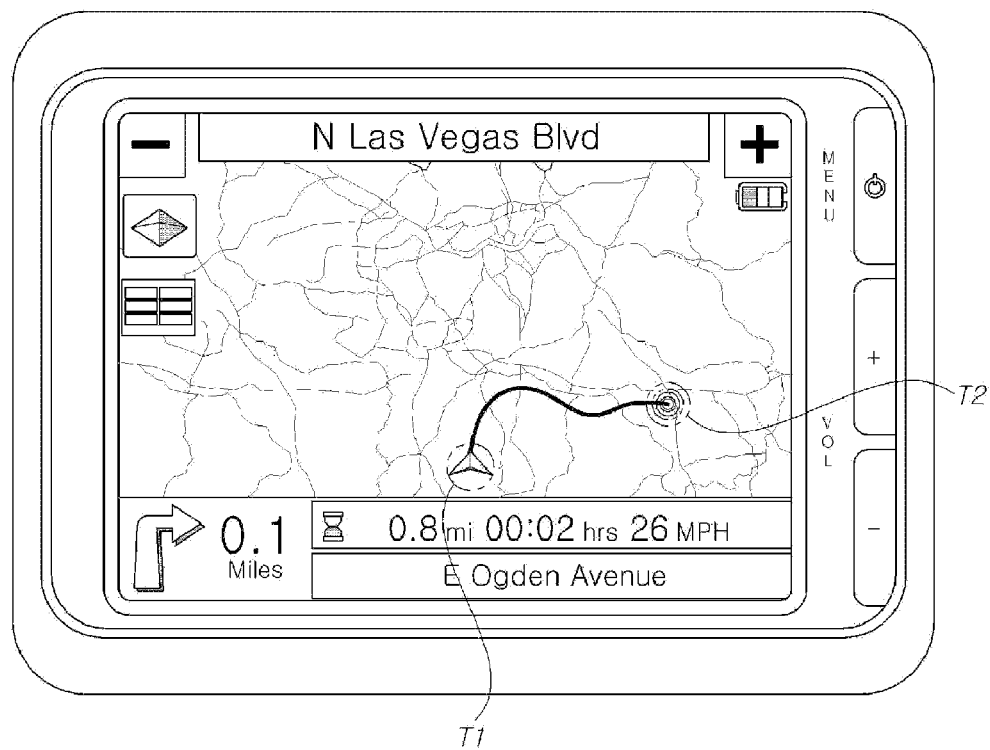
FIGS. 5a and 5b are overviews of display screens illustrating setting a path using a multi-touch input operation according to still another embodiment of the present invention.
Figure 5B:
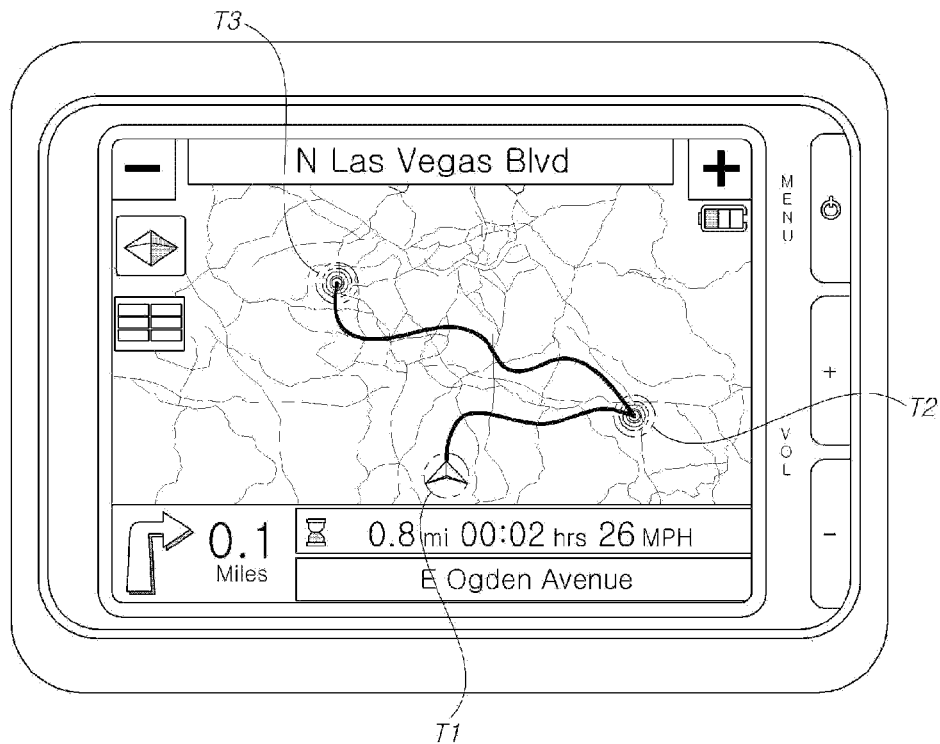

Next, FIGS. 5a and 5b illustrate another embodiment of setting a path using a multi-touch input operation in which the path setting function is only performed when an input first touch point T1 corresponds to the current position of the vehicle. In more detail, and as shown in FIG. 5a, the user first touches the position T1 that corresponds to the current position of the vehicle and then touches the second position T2 (while maintaining the touching of the first position T2). The user then releases the touched positions T1 and T2, and the controller 20 calculates the traveling route between the first and second positions T1 and T2. FIG. 5b is similar to FIG. 5a, but includes three touched positions T1, T2 and T3. That is, the user first touches the current position of the vehicle T1, and then touches the positions T2 and T3 in sequential order. The controller 20 then displays a traveling route from the current position of the vehicle T1 to the second position T2 and to the final position T3.

In addition, this embodiment is particularly advantageous, because the controller 20 does not perform the process of setting or determining a traveling route unless the user first touches the current position of the vehicle (indicated by an arrow in FIGS. 4 and 5 as an example). Therefore, the user can set the controller 20 into a traveling route calculating mode by touching the current position of the vehicle and then touching another position on the displayed map.

Figure 6:
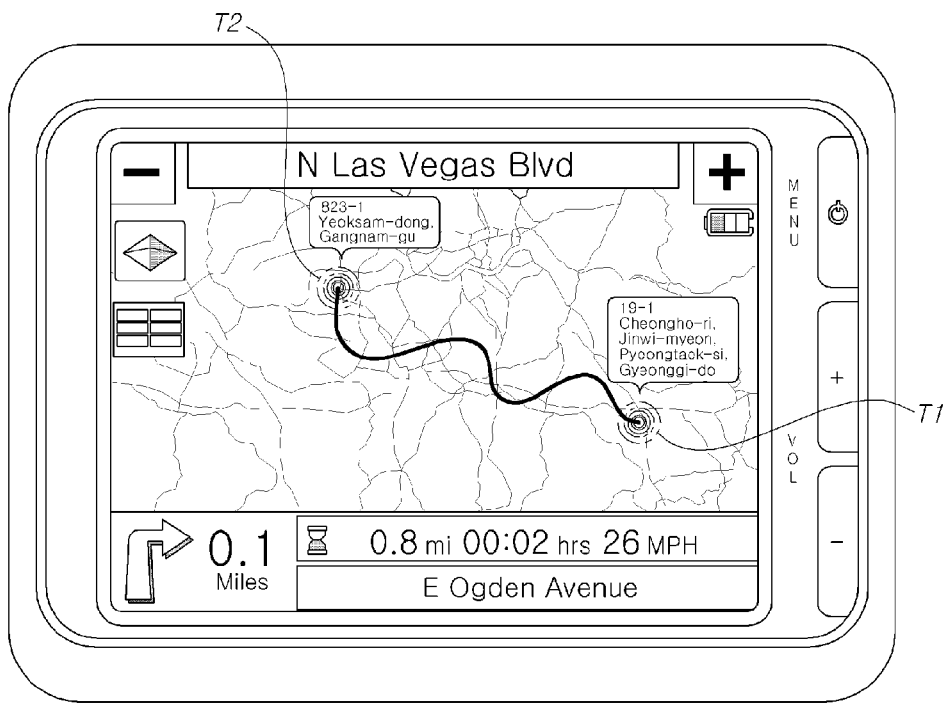
FIG. 6 is an overview of a display screen displaying position information for a multi-touch input operation according to an embodiment of the present invention.

Further, the controller 20 can also advantageously display information about the touched positions. For example, FIG. 6 illustrates the controller 20 displaying information about the touched positions T1 and T2. Thus, the user can verify that the touched positions are the positions or locations the user wanted to touch. Also, when the user is randomly touching the positions T1 and T2, the user can view information about the touched positions T1 and T2. The information displayed in FIG. 6 includes the physical locations of the touched positions T1 and T2, but may also include Point of Interest (POI) information about the touched positions such as nearby gas stations, hotels, restaurants, etc.

The above-described embodiments relate to the controller 20 calculating and displaying a traveling route based on the user touching positions on displayed map information. In addition, the user can release a touched position and touch another position such that the released touched position is not used in calculating the traveling route. In an alternative embodiment, the controller 20 can display position or POI information when the user touches a particular position such that the user can quickly determine if the touched position is one that should be included in the calculated traveling route. If the user determines the touched position is not to be included the traveling route based on the displayed information, the user can release the touched position and touch another position. Thus, the controller 20 displays new position information about the newly touched position.

For example, with reference to FIG. 6, the user can view the information about the second touched position T2 and realize this is not the correct location they want to travel to. Thus, the user can release the second touched position T2 (while maintaining the first touched position T1), and select a new second position. The controller 20 then would not display the information about the previously touched T2 position, but rather would display new information about the newly touched second position. Thus, the user can easily and effectively select a traveling route that suits their particular needs.

Figure 7:
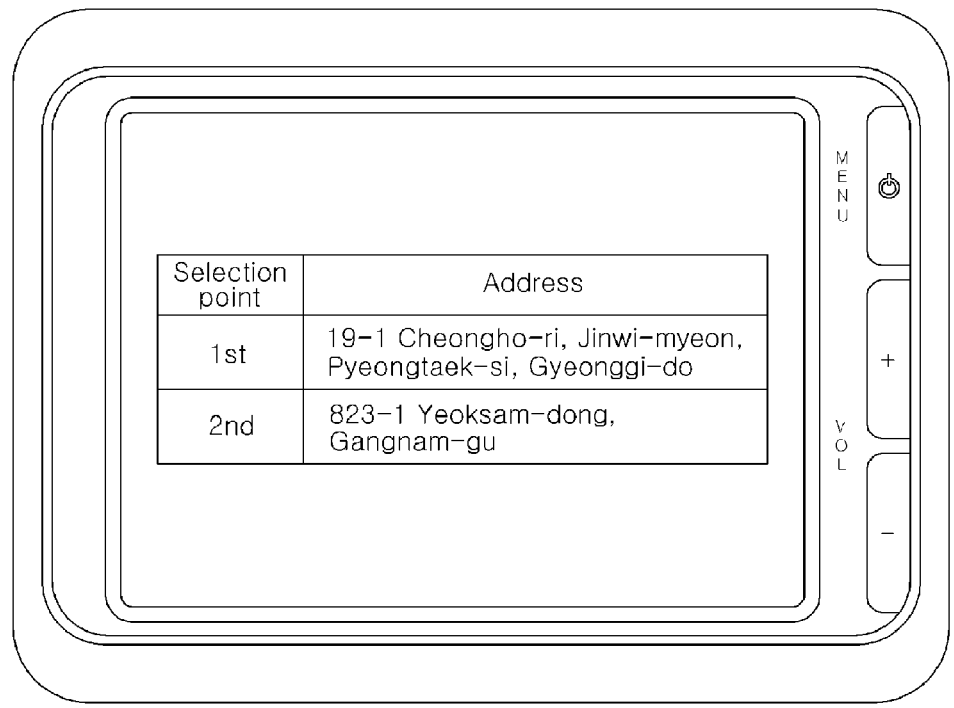
FIG. 7 is an overview of a display screen illustrating an example of a confirmation window for confirming the position of a multi-touch input operation according to an embodiment of the present invention.

In addition, in still another embodiment of the present invention, the controller 20 can display a confirmation window providing detailed information about the selected touch points. For example, FIG. 7 illustrates a confirmation window including detailed information about the positions touched in FIG. 6. The controller 20 displays the information shown in FIG. 6 after the user releases the touched positions T1 and T2. The controller 20 also preferably displays the confirmation window shown in FIG. 7, before executing a corresponding execution command (e.g., a path search or setting command). In this way, the user can confirm the touched points are accurate before proceeding to the calculation and display of the traveling route between the touched points.

In addition, if the user determines the touched points are not the locations they desired, the user can touch a particular location in the confirmation window to manually edit a particular location. That is, the user can manually input via a keypad the address, etc. of a particular location they want to be included in the calculated traveling route. The user can also manually add a new third location using the confirmation window by selecting an "add location" icon on the confirmation window, for example. The user can also manually input an address, a store name, or a phone number related to a touched position.

Further, the displayed confirmation window shown in FIG. 7 can be made to automatically disappear after a predetermined amount of time, by a user performing a close window operation, by double touching the confirmation window, etc. The controller 20 then calculates and provides a traveling route between the selected positions. The displayed confirmation window can also include an "execute" soft button or icon that can be selected by the user to have the controller 20 perform the executing process.

Figure 8A:
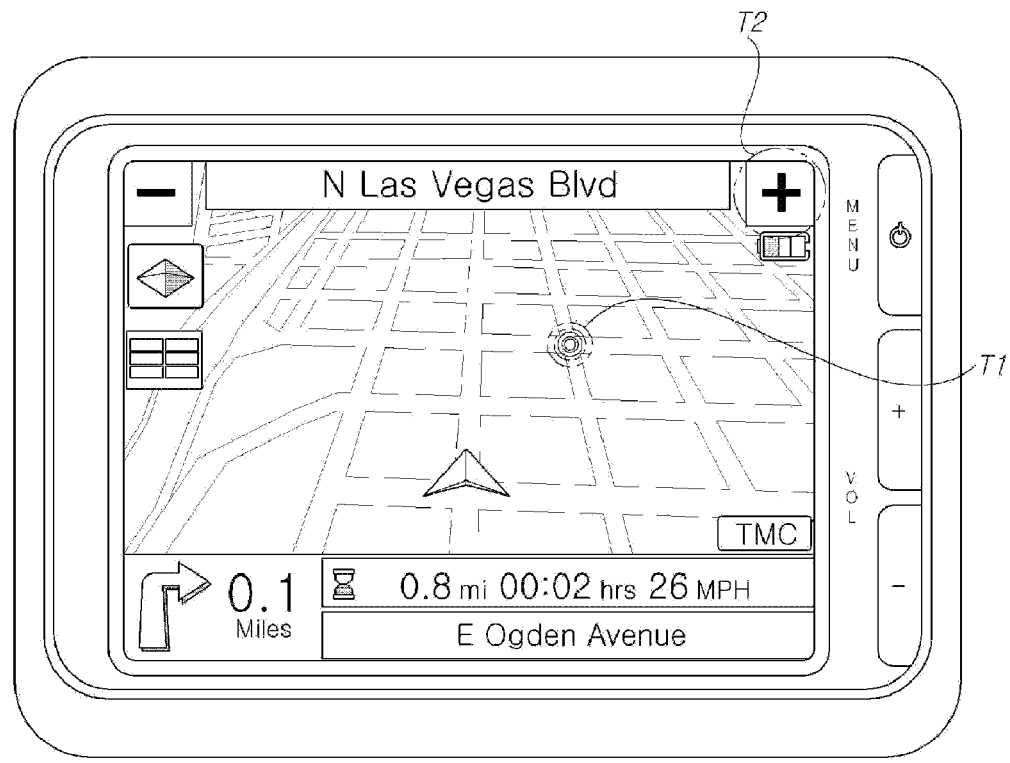
FIGS. 8a and 8b are overviews of display screens illustrating a method of adjusting a magnification of a screen using a multi-touch input operation according to an embodiment of the present invention.
Figure 8B:
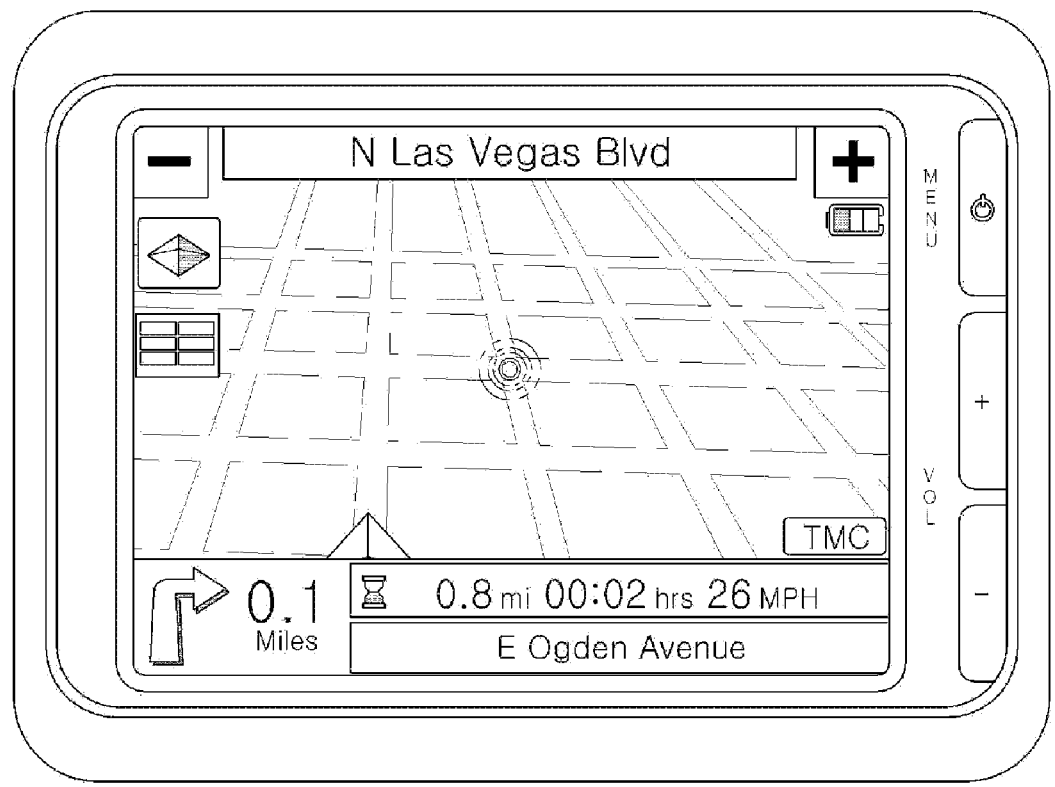

In addition, the above-described embodiments relate to the controller 20 providing a traveling route between selected positions. However, in another embodiment of the present invention, the controller 20 performs a magnification/zooming process based on multiple touched points. These features are illustrated in FIGS. 8a and 8b. In more detail, and as shown in FIG. 8a, the user first touches the position T1 and then touches a second position T2 corresponding to a magnification icon. Thus, in this embodiment, the controller 20 enlarges or zooms in on the area corresponding to the touched position T1 as shown in FIG. 8b. That is, in the embodiment, if a user inputs a first touch T1 at one portion of the display screen and a second touch T2 at a portion where a screen enlargement function is assigned as shown in FIG. 8a, the screen is enlarged with the first touch point centered as shown in FIG. 8b. A similar concept applies to the user selecting a first position T1 and then selecting the zoom out icon shown in the upper left hand corner of FIGS. 8a and 8b. Further, the order of touches can be reversed. That is, the user can first touch the zoom in or zoom out icon and then touch a particular point on the displayed map.

Thus, the embodiments of the present invention provide several advantages. For example, the user can easily request a path search command be executed by simply touching different points on the screen. The user can also request a traveling route be provided with multiple locations by performing a multiple touch operation. Each touched location is then included in the provided traveling route. The user can also easily zoom in and out on a displayed image or map by touching particular portions of the displayed information.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a navigation apparatus, the method comprising:
   displaying map information on a touch screen display unit of the navigation apparatus;
   receiving at least a first touch input signal corresponding to a touching of a first position on the display unit and a second touch input signal corresponding to a touching of a second position on the display unit while the first position is continuously touched;
   calculating, via a controller, a traveling route including the touched first and second positions;
   displaying the calculated traveling route on the displayed map information, wherein the calculated traveling route includes the first and second positions;
   storing first information corresponding to the first touched position and second information corresponding to the second touched position;
   receiving a touch release signal indicating one of the first and second touched positions has been released; and
   deleting the first information if the touch release signal indicates the first touched position has been released and deleting the second information if the touch release signal indicates the second touched position has been released.

2. The method of claim 1, wherein the calculating step is performed only when the first and second touched positions are released from being touched.

3. The method of claim 1, further comprising:
   receiving at least a third touch input signal corresponding to a touching of a third position on the display unit while the first and second positions are continuously touched,
   wherein the calculating step further comprises calculating a traveling route including the touched first, second and third positions, and
   wherein the displaying step displays the calculated traveling route on the displayed map information to inform the driver of the vehicle including the navigation apparatus about the calculated traveling route including the first, second and third positions.

4. The method of claim 1, wherein the displaying step further comprises displaying information about the first and second touched positions as the first and second positions are touched.

5. The method of claim 4, wherein the displayed information includes at least one of location information identifying locations of the first and second position and points of interest information identifying points of interest near the first and second positions.

6. The method of claim 1, further comprising:
   receiving at least a third touch input signal corresponding to a touching of a third position on the display unit while the first and second positions are continuously touched,
   wherein the calculating step further comprises calculating a traveling route in sequential order from the first touched position to the second touched position and then to the third touched position, and
   wherein the displaying step displays the calculated traveling route on the displayed map information to inform the driver of the vehicle including the navigation apparatus about the calculated traveling route in sequential order from the first touched position to the second touched position and then to the third touched position.

7. The method of claim 1, further comprising:
   receiving at least a third touch input signal corresponding to a touching of a third position on the display unit while the first and second positions are continuously touched,
   wherein the calculating step further comprises calculating a preferred traveling route irrespective of a sequential order from the first touched position to the second touched position and then to the third touched position, and
   wherein the displaying displays the calculated preferred traveling route on the displayed map information to inform the driver of the vehicle including the navigation apparatus about the calculated preferred traveling route.

8. The method of claim 1, wherein the calculating step only calculates the traveling route including the touched first and second positions when the first touched position corresponds to a current location of the vehicle.

9. The method of claim 1, further comprising:
   magnifying or reducing the displayed map information based on the received first and second touch signals.

10. A navigation apparatus, comprising:
    a display unit including a touch screen and configured to display map information;
    a receiving unit configured to receive at least a first touch input signal corresponding to a touching of a first position on the display unit and a second touch input signal corresponding to a touching of a second position on the display unit while the first position is continuously touched;
    a controller configured to calculate a traveling route including the touched first and second positions, and to control the display unit to display the calculated traveling route on the displayed map information, wherein the calculated traveling route includes the first and second positions; and
    a memory unit configured to store first information corresponding to the first touched position and second information corresponding to the second touched position,
    wherein the receiving unit is further configured to receive a touch release signal indicating one of the first and second touched positions has been released, and
    wherein the controller is further configured to delete the first information if the touch release signal indicates the first touched position has been released and to delete the second information if the touch release signal indicates the second touched position has been released.

11. The navigation apparatus of claim 10, wherein the controller is further configured to calculate the traveling route only when the first and second touched positions are released from being touched.

12. The navigation apparatus of claim 10, wherein the receiving unit is further configured to receive at least a third touch input signal corresponding to a touching of a third position on the display unit while the first and second positions are continuously touched,
- wherein the controller is further configured to calculate a traveling route including the touched first, second and third positions, and
- wherein the display unit is further configured to display the calculated traveling route on the displayed map information to inform the driver of the vehicle including the navigation apparatus about the calculated traveling route including the first, second and third positions.

13. The navigation apparatus of claim 10, wherein the display unit is further configured to display information about the first and second touched positions as the first and second positions are touched.

14. The navigation apparatus of claim 13, wherein the displayed information includes at least one of location information identifying locations of the first and second position and points of interest information identifying points of interest near the first and second positions.

15. The navigation apparatus of claim 10, wherein the receiving unit is further configured to receive at least a third touch input signal corresponding to a touching of a third position on the display unit while the first and second positions are continuously touched,
- wherein the controller is further configured to calculate a traveling route in sequential order from the first touched position to the second touched position and then to the third touched position, and
- wherein the display unit is further configured to display the calculated traveling route on the displayed map information to inform the driver of the vehicle including the navigation apparatus about the calculated traveling route in sequential order from the first touched position to the second touched position and then to the third touched position.

16. The navigation apparatus of claim 10, wherein the receiving unit is further configured to receive at least a third touch input signal corresponding to a touching of a third position on the display unit while the first and second positions are continuously touched,
- wherein the controller is further configured to calculate a preferred traveling route irrespective of a sequential order from the first touched position to the second touched position and then to the third touched position, and
- wherein the display unit is further configured to display the calculated preferred traveling route on the displayed map information to inform the driver of the vehicle including the navigation apparatus about the calculated preferred traveling route.

17. The navigation apparatus of claim 10, wherein the controller is further configured to calculate the traveling route including touched first and second positions only when the first touched position corresponds to a current location of the vehicle.

18. The navigation apparatus of claim 10, wherein the controller is further configured to magnify or reduce the displayed map information based on the received first and second touch signals.

* * * * *